Aug. 20, 1963    M. C. VOSBURGH ETAL    3,101,470
DOPPLER RADAR
Filed April 10, 1959    3 Sheets-Sheet 1
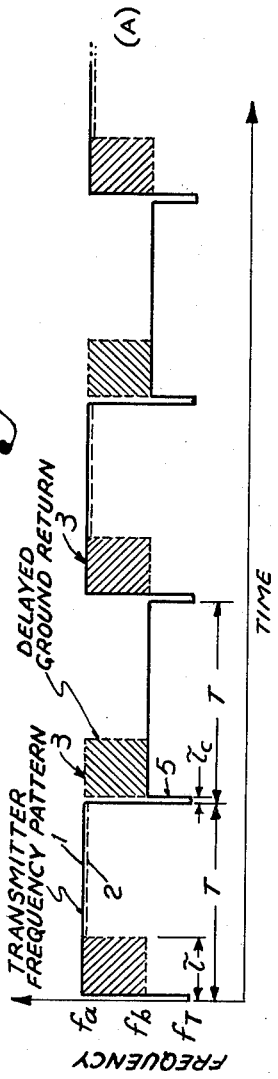
Fig. 1
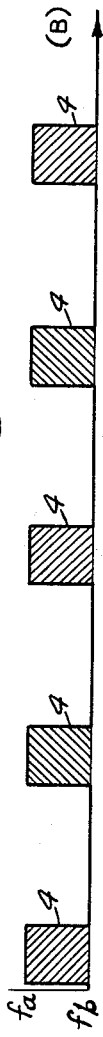
Fig. 2
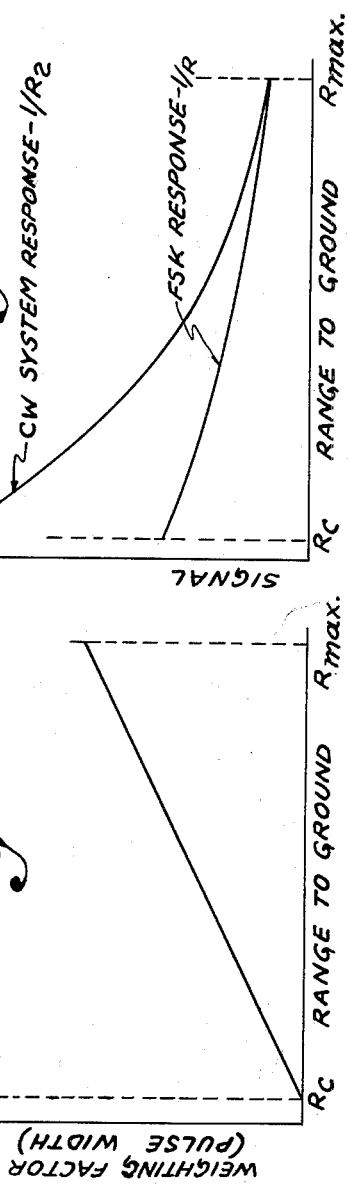
Fig. 3
Fig. 4
INVENTORS.
MALCOLM C. VOSBURGH
BY JOSEPH MURGIO
ATTORNEY

INVENTORS.
MALCOLM C. VOSBURGH
JOSEPH MURGIO
BY
ATTORNEY

United States Patent Office 3,101,470
Patented Aug. 20, 1963

3,101,470
DOPPLER RADAR
Malcolm C. Vosburgh, Montclair, and Joseph Murgio, Clifton, N.J., assignors to International Telephone and Telegraph Corporation, Nutley, N.J., a corporation of Maryland
Filed Apr. 10, 1959, Ser. No. 805,459
13 Claims. (Cl. 343—9)

This invention relates to Doppler radar systems for determination of the movement and position of a moving vehicle and more particularly to a frequency shift keyed (F.S.K.) continuous wave Doppler radar system.

The most straightforward method of Doppler radiation in Doppler radar systems is the continuous wave (C.W.) Doppler. Although it is conceptually and physically the simplest method, the C.W. Doppler scheme has severe design problems. One major problem encountered in the design of the C.W. Doppler is the difficulty of isolating the receiver from the locally generated noise. This noise originates primarily from local vibrating surfaces and components and from the transmitter noise leaking into the receiver. Furthermore, since a C.W. Doppler system has no range resolution, this problem is aggravated by the fact that the system must cope with these noise sources while attempting to receive the true Doppler signal from distant sources. Various methods have been used to reduce or eliminate these problems which inhere in the C.W. Doppler. To reduce the noise generation, improvements have been made in the transmitting tube, the mounting of components and antennas have been stiffened to reduce vibration and various means have been devised to reduce the coupling between transmitter and receiver. These efforts have centered around the development of waveguide duplexers and space duplexers. The waveguide duplexer approach is concerned with items such as hybrids and circulators employing ferrites, while the space duplexer approach utilizes the idea of two separate antennas, one for transmitting and one for receiving. The results to date have not been satisfactory since in the case of duplexers substantial reliable isolation has not yet been achieved. Also the waveguide duplexer (hybrid and circulator) approach places very stringent requirements on the antenna standing wave ratio, since reflections from antenna limit the isolation available in the duplexer so that even if the circulators themselves can be improved the antenna standing wave ratio problem will still remain. The suggested solution of two antennas is not entirely satisfactory because the system requires additional components, is wasteful of space and the decoupling between the two separate antennas is often too marginal to warrant their use. Other methods used to eliminate the C.W. Doppler noise problems by more complex modulation processes include the pulsed C.W. or long pulse and the frequency modulated C.W. (F.M.–C.W.). In the long pulse radar system, the transmitter has a 50 percent duty cycle and is off when the receiver is on. Therefore, signals that go into the receiver compete with the noise due essentially to the receiver alone. Because of the blanking of the receiver, range resolution is built into the system, and the noise due to local sources which plague the C.W. system is completely avoided. However, there are still major problems confronting the long pulse method. One is maintaining coherence during the transmitter "off," and another relates to how fast and how completely the transmitter can be turned off. Pulse radar systems also require more power than continuous wave Dopplers. Some of the defects of the frequency modulated C.W. are power losses which amount to approximately 10 db for typical sidebands and the problems of frequency modulation of the klystron.

It is an object of this invention to provide a simple and economical method using continuous wave Doppler which is not subject to the noise vibration problem of the conventional C.W. Doppler systems.

Another object is to provide a continuous wave Doppler radar which has the advantages of the pulsed radar and utilizes the more economical continuous wave transmission.

A feature of this invention is a Doppler radar system for use on board a vehicle to determine the movement and position of the vehicle relative a reradiating element utilizing continuous wave transmission. Means are provided to shift the frequency of the continuous waves between two frequencies and transmit the frequency shifted continuous waves. The received reradiated frequency shifted waves are mixed with the energy of the frequency shifted waves prior to transmission to obtain a mixture of signals carrying the movement and position information of the vehicle relative the reradiating element.

Another feature is that an intermediate frequency amplifier having a pass band which is equal to the difference frequency between the two frequency shifted signals is coupled to the output of the mixer, and an output of the intermediate frequency amplifier occurs during the elapsed time when the transmission of a frequency shifted continuous wave at a first frequency coincides with the reception of a reradiated frequency shifted continuous wave at a second frequency. The output of the intermediate frequency amplifier is essentially a pulsed output wherein the duration of the pulse is equivalent to twice the range of the vehicle to the reflecting element.

A further feature is that the means to frequency shift key the carrier frequency of the transmitter comprises a serrodyne frequency translator utilizing a traveling wave tube for frequency translation of the carrier.

Still another feature is another embodiment of this invention wherein the serrodyne frequency translator utilizes a ferrite phase shifter.

The above-mentioned and other features and objects of this invention will become more apparent by reference to the following description taken in conjunction with the accompanying drawings, in which:

FIG. 1 is a graph showing the frequency of the transmitted signal and the received reradiated signal;

FIG. 2 is a graph showing the frequency output of the mixer of the receiver at the I.F. frequency;

Figure 5:
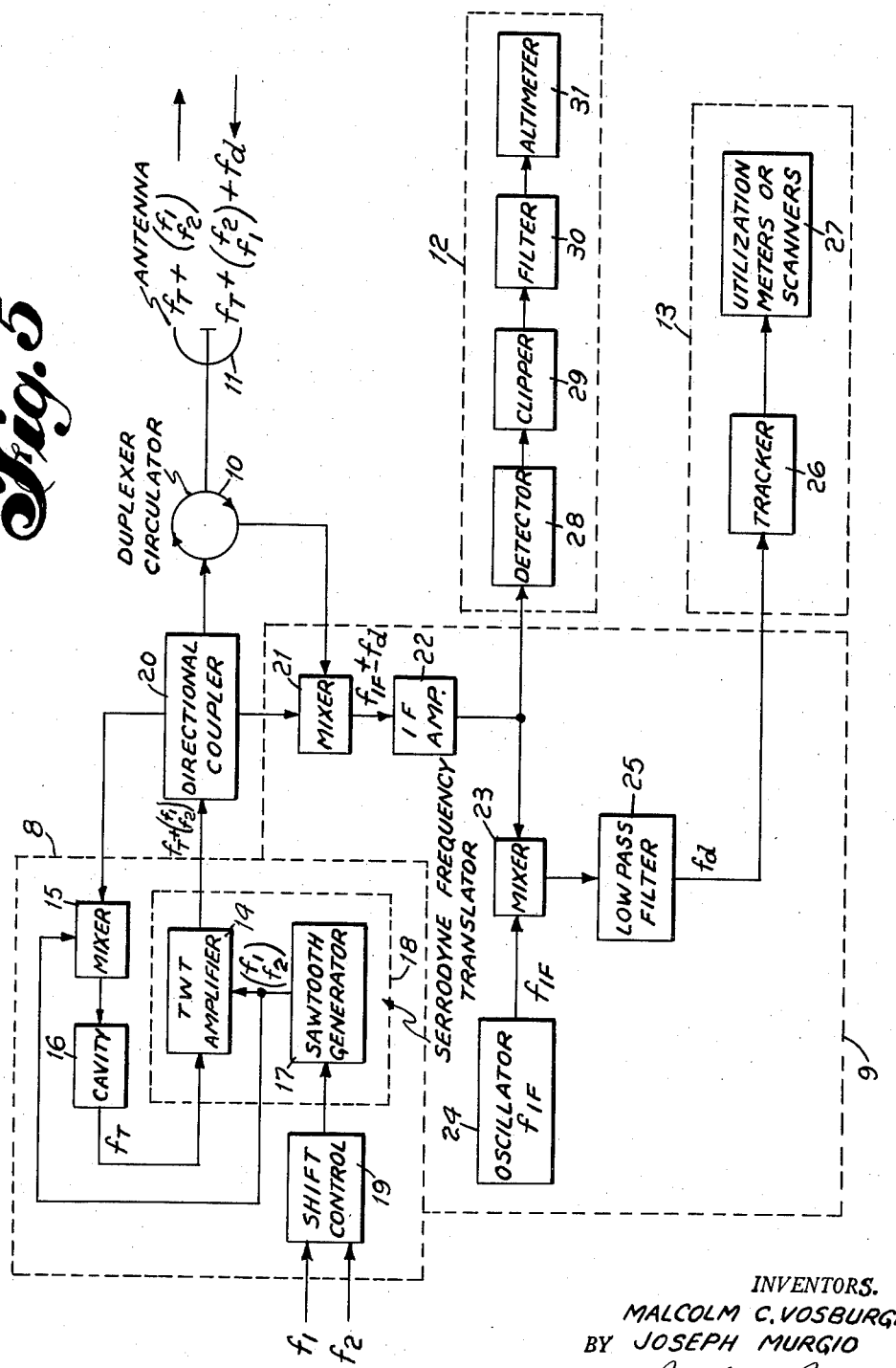
Figure 6:
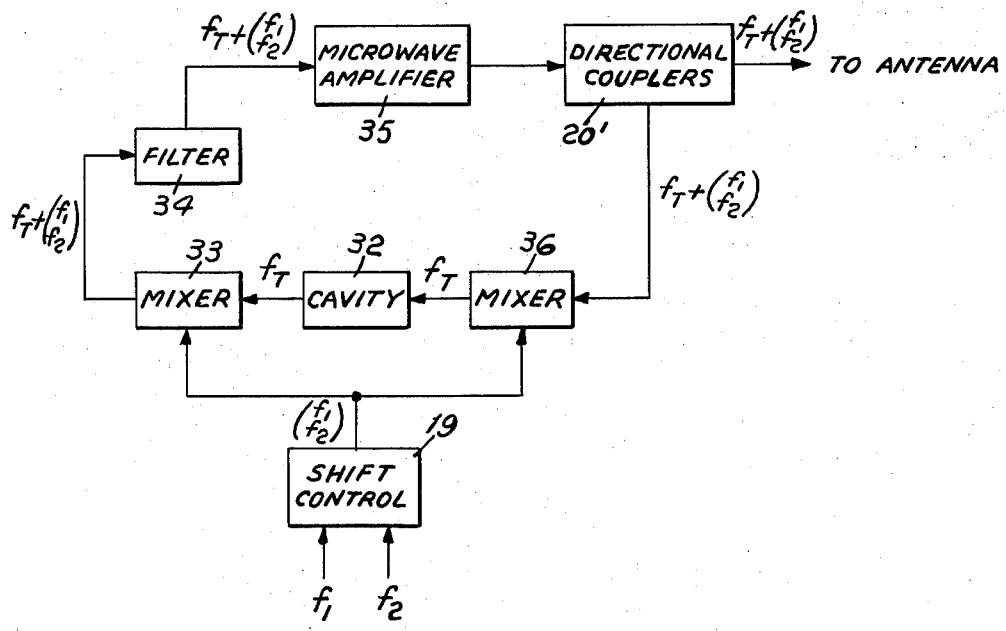

FIG. 3 is a graph to illustrate signal-to-range characteristics of C.W. Doppler radar and the F.S.K. Doppler radar of this invention;

FIG. 4 is a graph illustrating the weighting factor vs. range;

FIG. 5 is a block diagram of one embodiment of this invention;

FIG. 6 is a second embodiment; and

Figure 7:
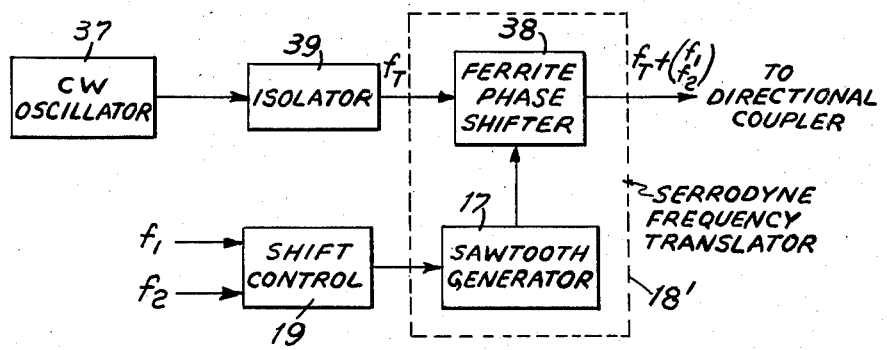

FIG. 7 is a third embodiment.

Referring to FIGS. 1 to 4, inclusive, if a transmitter is frequency shift keyed by a square wave of half period T, its output would then be in the form of a solid line 1 in FIGURE 1, the output frequency shifting from $f_a$ to $f_b$ and back again in 2T microseconds. The received reradiated wave shown by the broken line 2, which is drawn slightly displaced for clarity, is received after a delay $\tau$. The length of the overlap 3 of the reradiated signal relative the transmitted signal, that is, the time during which the received signal is at a different frequency from the transmitted signal, is equal to the time T which is equivalent to twice the range of the target from the transmitter. At zero overlap the target is at the transmitter and as the range progressively increases, the overlap 3 increases until it is equal to T the maximum. Now, if the reradiated wave 2 is mixed with the transmitted wave as in the F.M.-C.W. systems and if $f_a$ and $f_b$ are adjusted so that their difference is equal to the intermediate frequency, the output of the mixer at the I.F. frequency is a train of pulses 4 of period T, with the pulse width modulation proportional to the delay of the reradiated signal. The pulse width varies from zero for signals reflected with no delay to 100 percent (that is to say, C.W. reception) for delays of T microseconds. If T is adjusted so that it is equal to the time for the radar signal to travel to the target at the maximum altitude (when the radar beam travels the distance $R_{max}$), then as shown in FIG. 4 all the targets between the aircraft and $R_{max}$ will be weighted signal wise according to their range R. When this effect is added to the ratio $$\frac{1}{R^2}$$

attenuation for an infinite earth, the result is a $$\frac{1}{R}$$

range weight. The weighting factor is the pulse width which automatically adjusts to increasing pulse width for increasing range, thus tending to produce signals for all ranges up to $R_{max}$ which do not vary excessively as in the C.W. Doppler. FIG. 3 illustrates the improvement of the F.S.K.-C.W. system over the conventional C.W. Doppler radar as regards signal vs. range. In the C.W. system the signal attenuation is of the order of $$\frac{1}{R^2}$$

in the F.S.K. system the attenuation is of the order of $$\frac{1}{R}$$

Because the duration of the output of the I.F. amplifier is proportional to the range of the reradiating element from the moving vehicle, the average signal power output is fairly constant for all ranges up to $R_{max}$. The return reradiated signal has the characteristics of a C.W. system at high altitudes. At $R_{max}$ the overlap of the received signal relative transmitted signal is equal to T and then the C.W. Doppler signal and the F.S.K.-C.W. Doppler are equivalent in signal strength because their waveforms are equal. If the system is made sensitive enough to operate as $R_{max}$, all other ranges for signal return which, although they are lower than the optimum C.W. case, are higher than the minimum allowable signal obtained at $R_{max}$. Also, the frequency shift keyed C.W. system possesses a pulse nature. That is, if a small amount of dead time $T_c$ as shown in the spaces 6 inserted between the shifter is incorporated in the system, the ranges up to $R_c$ $$\left(\text{where } R_c = C\frac{T_c}{2}\right)$$

away from the aircraft have no return signal at all. In this way all local disturbances, such as noise and vibration, are eliminated. The relative dimension of $R_c$ and $T_c$ has been shown exaggerated for purposes of illustration. As an example, $R_c$ may be made equivalent to approximately 20 feet or whatever distance is necessary to eliminate any local disturbance.

FIG. 5 shows one embodiment of this invention. The system includes a transmitter 8, a receiver 9, a duplexer circulator 10 and an antenna 11. There is also included a range determination unit 12 and a velocity determination unit 13. A traveling wave tube 14 is used as an amplifier in a closed loop including a mixer 15 and a microwave resonant cavity 16. The cavity 16 is resonant at the transmitter frequency $f_T$, and the traveling wave tube gain is such that the loop will oscillate $f_T$ with the traveling wave tube at saturation level. In order to introduce the frequency shift, the traveling wave tube 14 and a saw-tooth generator 17 are used as a serrodyne frequency translator 18. A serrodyne frequency translator will translate or shift the frequency of a signal in a nearly ideal manner. Linear saw-tooth modulation of a transit-time device, such as T.W.T. or a klystron, is employed to effect the translation of the power output at the translated frequency and is practically equal to the capability of the same device operating as an ordinary amplifier. Furthermore, very little power is produced in undesired intermodulation frequency components. In the serrodyne operation, a sine wave is applied to the input of the saw-tooth generator where it is converted into a linear saw tooth of the same frequency. This saw-tooth wave is applied to the helix of the traveling wave tube with amplitude of such magnitude as to advance the phase of the output signal just 360 degrees. This has the effect of shifting the output frequency of the T.W.T. by just the frequency of the saw-tooth wave. A source of signals $f_1$ and $f_2$ are coupled to a shift control device 19 which may be any of the conventional frequency shift keying devices and the output of the shift control 19 is coupled to the saw-tooth generator 17. The shift control 19 allows the saw-tooth generator to apply saw tooths of frequency $f_1$ and $f_2$, T seconds each. $T_c$, the dead time, is introduced at the switch-over at which time no saw-tooth wave is used, and the output frequency of the T.W.T. 14 is $f_T$. $T_c$ can be made a small fraction of a microsecond if desired. In order to maintain oscillation some of the output of the T.W.T. 14 which is alternatively at $f_T + f_1$ and $f_T f_2$ $$\left(\text{in notation: } f_T + \begin{bmatrix} f_1 \\ f_2 \end{bmatrix}\right)$$

is removed through a directional coupler 20 and mixed with the prevailing saw-tooth wave in the mixer 15 at that instant. The output of the mixer which contains $f_T$ is fed into the cavity 16 to maintain oscillation.

The main part of the output power of the traveling wave tube 14 is passed through the duplexer circulator 10 and to the antenna 11. The return reradiated signal which is now delayed is passed through the circulator 10 to the signal mixer 21 where it is mixed with some of the transmitter signal fed through the directional coupler 20. The output of the mixer 21 which contains the signals $f_{1f} + f_d$ is fed into an intermediate frequency amplifier 22 which has a band pass frequency equal to the difference between the signals $f_1 + f_2$. The frequency shift keyed detection thus produces an intermediate frequency signal of pulse width proportional to the range. The output of the I.F. amplifier 22 is then fed into a mixer 23 to which is coupled the output of an oscillator 24 generating a signal with the frequency $f_{if}$. The output of the mixer 23 is then coupled to the input of a low pass filter 25 to produce as the output thereof the Doppler frequency signal $f_d$. The signal $f_d$ is coupled to a tracker unit 26 such as for instance described in the article "Factors in the Design of Airborne Doppler Navigation Equipment," by E. G. Walker, on pages 425 to 444 in the Journal of the British IRE, July 1958. The tracker system is shown more particularly in Fig. 11 on page 436 and fully described therein. The function of the tracker unit is to process the Doppler frequency signal and provide a voltage representing the velocity of the vehicle relative the reradiating element. In the case of an aircraft carrying the Doppler radar, the velocity voltage would be an indication of the ground speed of the aircraft. The discriminator tracker shown in FIG. 11 of the Walker article also will provide voltages representing the drift angle and the distance flown when a compatible antenna scheme is used. The voltage output of the tracker unit 26 is then fed into a utilization unit 27 which may be in the form of a meter or a scanning unit to give the indication of the velocity of the vehicle in the direction of the antenna pointing, the drift angle and the distance flown. The output of the tracker may also be fed into a counter unit (not shown)

to count the cycles of the Doppler frequency $f_d$ over a fixed period and thus provide a digital indication of the velocity. The range information derived from the output of the intermediate frequency amplifier 22 is fed into a detector 28 to derive the envelope of the I.F. signal. The output of the detector 28 is fed into a clipper 29 and from thence into a filter 30 to provide a D.C. voltage of a certain amplitude proportional to the slant range. The output of the filter is then fed into a meter or altimeter 31 calibrated to compensate for the angle of the slant range and thus provide an indication of the height of the vehicle above the reradiating element.

A second embodiment of the transmitter of this invention is illustrated in FIG. 6. In this embodiment, the carrier is shifted using conventional means and equipment. The microwave cavity 32 resonates at the base transmitter frequency $f_T$, and the signal output of the cavity is fed into a crystal mixer 33. The shift control 19 selects $f_1$ or $f_2$ to be mixed with $f_T$. After mixing, the high pass filter 34 passes the upper sideband to the amplifier 35 where it is amplified to output power. As before, some of the output is tapped by means of the directional coupler 20′, and mixed in the mixer 35 with the prevalent shifting frequency to obtain $f_T$ for sustaining the resonant cavity 32 oscillation.

A third embodiment is illustrated in FIG. 6 and shows how the F.S.K. carrier can be obtained in a very simple manner by use of a ferrite phase shifter. A conventional C.W. oscillator 37 is coupled to a ferrite phase shifter 38 by an isolator 39. The ferrite phase shifter 38 is capable of shifting the transmitter output in phase by 360 degrees. As explained above, a serrodyne current output of the saw-tooth generator 17 is applied to the phase shifter 38 to effect frequency translation of the same sort as in the T.W.T. embodiment. In this embodiment, the saw-tooth generator 17 and the ferrite phase shifter 38 together constitute a serrodyne frequency translator 18′.

While we have described above the principles of our invention in connection with specific apparatus, it is to be clearly understood that this description is made only by way of example and not as a limitation to the scope of our invention as set forth in the objects thereof and in the accompanying claims.

We claim:

1. A Doppler radar system for use on board a vehicle to determine the movement of said vehicle relative a reradiating element comprising a source of continuous wave signals at a given frequency, means to convert the signals of said source to continuous wave signals of first and second frequencies sequentially, means to transmit said sequential first and second frequency signals, means to receive the reradiated first and second frequency signals from said element, means for mixing said received reradiated first and second signals with the output of said converting means to obtain a mixture of signals carrying the velocity and range information of said vehicle relative said reradiating element.

2. A Doppler radar system according to claim 1 further containing means to derive from said mixture of signals the velocity and range of said vehicle relative said reradiating element.

3. A Doppler radar system for use on board a vehicle to determine the movement of said vehicle relative a reradiating element comprising a source of continuous signals at a given frequency, means to convert the signals of said source to continuous wave signals of first and second frequencies sequentially, means to transmit said sequential first and second frequency signals, means to receive the reradiated first and second frequency signals from said element, and means for mixing said received reradiated first and second signals with the output of said converting means to obtain a mixture of signals including the Doppler frequency signal representing the velocity of said vehicle relative said reradiating element.

4. A Doppler radar system according to claim 3 further containing means to derive from said Doppler frequency signal the velocity of said vehicle relative said reradiating surface.

5. A Doppler radar system according to claim 3 further including an intermediate frequency amplifier and an output of said intermediate frequency amplifier occurs during the elapsed time when the transmission of a frequency shifted continuous wave at said first frequency coincides with the reception of a reradiated frequency shifted continuous wave at said second frequency.

6. A Doppler radar system for use on board a vehicle to determine the movement and position of said vehicle relative a reradiating element comprising a source of continuous wave signals at a given frequency, means to convert the signals of said source to continuous wave signals of first and second frequencies sequentially, means to transmit said sequential first and second frequency signals, means to receive the reradiated first and second frequency signals from said element including the Doppler frequency, means for mixing said received reradiated first and second signals with the output of said converting means, an intermediate frequency amplifier, and means coupling the output of said mixing means to said intermediate frequency amplifier wherein an output of said intermediate frequency amplifier occurs only when said first and second frequency signals are simultaneously present in said mixing means.

7. A Doppler radar system according to claim 6 wherein said intermediate frequency amplifier has a pass band equal to the difference frequency of said first and second frequencies and said output of said intermediate frequency amplifier is in the form of discrete pulse signals having a pulse width equal to the time required for said transmitted wave to travel to said element and return therefrom to said receiver.

8. A Doppler radar system according to claim 7 further including means to make the duration time of transmission of said first and second frequencies equal and said duration time represents the maximum range of said element from said aircraft.

9. A Doppler radar system according to claim 8 further including means to inhibit transmission of each said transmitted waves at the commencement of each of said transmission time for a discrete interval of time.

10. A Doppler radar system for use on board a vehicle to determine the movement and position of said vehicle relative a reradiating element comprising resonant means tuned to operate at a given frequency, a frequency translator coupled to said resonant means, a source of signals at first and second frequencies, shift control means coupling said first and second frequency signals to said frequency translator whereby the frequency of said frequency translator output signal is alternatively the sum of the given frequency and either the first or second frequencies, a duplexer circulator, a directional coupler coupling the output of said frequency translator to said duplexer circulator, an antenna coupled to the duplexer circulator, a first mixer, means coupling said duplexer circulator to said first mixer whereby the signals received by said antenna are fed into said first mixer, means coupling the output of said directional coupler to said first mixer whereby the output of said frequency translator is fed into said first mixer to produce as the output of said first mixer a mixture of signals including signals having the frequencies equal to the difference between said first and second frequency shifted sum signals and the Doppler frequency, an intermediate frequency amplifier coupled to the output of said first mixer and adapted to pass said difference frequency and said Doppler frequency, an oscillator generating the signal having the frequency of said difference frequency, a second mixer, means coupling the output of said intermediate frequency amplifier and said oscillator to said second mixer, a low pass filter coupled to the output of said second mixer and adapted to pass the Doppler frequency signal, a tracker, means coupling the Doppler frequency signal to the input of said tracker, a display device coupled to the output of said tracker whereby the velocity, drift angle and distance traveled of said vehicle relative said reradiating element derived from said Doppler frequency signal is displayed; a detector, means coupling the output of said intermediate frequency amplifier to said detector to produce as the output of said detector the envelope of said intermediate frequency signal, a filter, a clipper coupling the output of said detector to said filter and a second display unit coupled to the output of said filter to reproduce thereon the range of said vehicle relative said reradiating element derived from said intermediate frequency signal.

11. A Doppler radar system for use on board a vehicle to determine the movement and position of said vehicle relative a reradiating element comprising a cavity tuned to resonate at a given frequency, a frequency translator including a traveling wave tube and a saw-tooth generator coupled to said traveling wave tube, means coupling the output of said cavity to said traveling wave tube, a source of signals of first and second frequencies, shift control means coupling said source of first and second frequency signals to said saw-tooth generator whereby said saw-tooth generator produces an output alternately of said first and second frequencies, a first mixer, means coupling the outputs of said traveling wave tube amplifier and said saw-tooth generator to said first mixer, means coupling the output of said first mixer to the input of said cavity whereby the output frequency of said cavity is at said given frequency and the frequency of said traveling wave tube output signal is alternatively the sum of the given frequency and either the first or second frequencies, a duplexer circulator, a directional coupler coupling the output of said traveling wave tube to said first mixer and said duplexer circulator, an antenna coupled to the duplex circulator, a second mixer, means coupling said duplexer circulator to said mixer whereby the signals received by said antenna are fed into said second mixer, means coupling the output of said directional coupler to said second mixer whereby the output of said traveling wave tube is fed into said second mixer to produce as the output of said second mixer a mixture of signals including signals having frequencies equal to the difference between said first and second frequency shifted sum signals and the Doppler frequency, an intermediate frequency amplifier coupled to the output of said second mixer and adapted to pass said signals of said difference frequency and said Doppler frequency, an oscillator generating a signal having the frequency of said difference frequency, a third mixer, means coupling the output of said intermediate frequency amplifier and said oscillator to said mixer, a low pass filter coupled to the output of said third mixer and adapted to pass the Doppler frequency signal, a frequency tracker, means coupling the Doppler frequency signal to the input of said tracker, a display device coupled to the output of said tracker whereby the velocity, drift angle and distance traveled of said vehicle relative said reradiating element derived from said Doppler frequency signal is displayed; a detector, means coupling the output of said intermediate frequency amplifier to said detector to produce as the output of said detector the envelope of and intermediate frequency signal, a filter, a clipper coupling the output of said detector to said filter and a second display unit coupled to the output of said filter to reproduce thereon the range of said vehicle relative said reradiating element derived from said intermediate frequency signal.

12. A Doppler radar system for use on board a vehicle to determine the movement and position of said vehicle relative a reradiating element comprising an oscillator tuned to operate at a given frequency, a frequency translator including a ferrite phase shifter and a saw-tooth generator coupled to said ferrite phase shifter, an isolator coupling the output of said oscillator to said ferrite phase shifter, a source of signals of first and second frequencies, shift control means coupling said source of first and second frequency signals to said saw-tooth generator whereby said saw-tooth generator produces an output alternately at said first and second frequencies and the frequency of said ferrite phase shifter output signal is alternatively the sum of the given frequency and either the first or second frequencies, a duplexer circulator, a directional coupler coupling the output of said ferrite phase shifter to said duplexer circulator, an antenna coupled to the duplexer circulator, a first mixer, means coupling said duplexer circulator to said first mixer whereby the signals received by said antenna are fed into said first mixer, means coupling the output of said directional coupler to said mixer whereby the output of said ferrite phase shifter is fed into said first mixer to produce as the output of said first mixer a mixture of signals having the frequencies equal to the difference between said first and second frequency shifted sum signals and the Doppler frequency, an intermediate frequency amplifier coupled to the output of said first mixer and adapted to pass said difference frequency and said Doppler frequency, an oscillator generating the signal having the frequency of said difference frequency, a second mixer, means coupling the output of said intermediate frequency amplifier and said oscillator to said second mixer, a low pass filter coupled to the output of said second mixer and adapted to pass the Doppler frequency signal, a tracker, means coupling the Doppler frequency signal to the input of said tracker, a display device coupled to the output of said tracker whereby the velocity, drift angle and distance traveled of said vehicle relative said reradiating element derived from said Doppler frequency signal is displayed; a detector, means coupling the output of said intermediate frequency amplifier to said detector to produce as the output of said detector the envelope of said intermediate frequency signal, a filter, a clipper coupling the output of said detector to said filter and a second display unit coupled to the output of said filter to reproduce thereon the range of said vehicle relative said reradiating element derived from said intermediate frequency signal.

13. A Doppler radar system for use on board a vehicle to determine the movement and position of said vehicle relative a reradiating element comprising a cavity tuned to resonate at a given frequency, first and second mixers coupled respectively to the input and output of said cavity, a source of signals at first and second frequencies, shift control means coupling said first and second frequency signal source to said first and second mixers, a microwave amplifier, filter means coupling the output of said second mixer to said microwave amplifier, a directional coupler coupling a portion of the output of said microwave amplifier to said first mixer, whereby the frequency of said microwave amplifier output signal is alternatively the sum of the given frequency and either the first or second frequencies, a duplexer circulator coupled to the output of said directional coupler, an antenna coupled to the duplexer circulator, a third mixer, means coupling said duplexer circulator to said third mixer whereby the signals received by said antenna are fed into said third mixer, means coupling the output of said directional coupler to said third mixer whereby the output of said microwave amplifier is fed into said third mixer to produce as the output of said third mixer a mixture of signals including signals having the frequencies equal to the difference between said first and second frequency shifted sum signals and the Doppler frequency, an intermediate frequency amplifier coupled to the output of said third mixer and adapted to pass said difference frequency and said Doppler frequency, an oscillator generating a signal having the frequency of said difference frequency, a fourth mixer, means coupling the output of said intermediate frequency amplifier and said oscillator to said mixer, a low pass filter coupled to the output of said fourth mixer and adapted to pass the Doppler frequency signal, a tracker, means coupling the Doppler frequency signal to the input of said tracker, a display device coupled to the output of said tracker whereby the velocity, drift angle and distance traveled of said vehicle relative said reradiating element derived from said Doppler frequency signal is displayed; a detector, means coupling the output of said intermediate frequency amplifier to said detector to produce as the output of said detector the envelope of said intermediate frequency signal, a filter, a clipper coupling the output of said detector to said filter and a second display unit coupled to the output of said filter to reproduce thereon the range of said vehicle relative said reradiating element derived from said intermediate frequency signal.

References Cited in the file of this patent

UNITED STATES PATENTS

| | | |
|---|---|---|
| 2,658,195 | McConnell | Nov. 3, 1953 |
| 2,695,995 | Cauchois | Nov. 30, 1954 |
| 2,840,808 | Woodward | June 24, 1958 |
| 2,883,656 | Russell | Apr. 21, 1959 |